(12) United States Patent
Mehta et al.

(10) Patent No.: US 7,200,451 B2
(45) Date of Patent: Apr. 3, 2007

(54) METHOD FOR CONSISTENT ON/OFF OBJECT TO CONTROL RADIOS AND OTHER INTERFACES

(75) Inventors: Pratik M. Mehta, Austin, TX (US); John Van Zile, Round Rock, TX (US); Luc Dinh Truong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 635 days.

(21) Appl. No.: 10/621,132

(22) Filed: Jul. 16, 2003

(65) Prior Publication Data

US 2005/0012532 A1  Jan. 20, 2005

(51) Int. Cl.
*G05B 15/00* (2006.01)
*G06F 3/00* (2006.01)
*G06F 13/28* (2006.01)

(52) U.S. Cl. .............. 700/83; 710/15; 710/18; 710/33; 327/155; 327/141; 327/146; 327/363

(58) Field of Classification Search .......... 327/155, 327/141, 146, 363; 700/83; 710/15, 18, 710/33
See application file for complete search history.

(56) References Cited

U.S. PATENT DOCUMENTS

| | | | |
|---|---|---|---|
| 5,093,830 A | | 3/1992 | Munter |
| 5,568,470 A | * | 10/1996 | Ben-Nun et al. ........... 370/238 |
| 6,279,049 B1 | * | 8/2001 | Kang ........................... 710/15 |
| 6,427,165 B1 | * | 7/2002 | Anderson .................... 709/217 |
| 6,430,576 B1 | | 8/2002 | Gates et al. |
| 6,600,797 B1 | | 7/2003 | Hasegawa et al. |
| 6,625,206 B1 | | 9/2003 | Doblar |
| 6,873,608 B1 | * | 3/2005 | Plotnik et al. .............. 370/328 |
| 7,028,114 B1 | * | 4/2006 | Milan et al. ................ 710/100 |
| 7,053,864 B1 | * | 5/2006 | Lee .............................. 345/3.4 |
| 2004/0181706 A1 | * | 9/2004 | Chen et al. ................. 713/600 |
| 2005/0239498 A1 | * | 10/2005 | Dorenbosch et al. ..... 455/552.1 |

* cited by examiner

*Primary Examiner*—Anthony Knight
*Assistant Examiner*—Sunray Chang
(74) *Attorney, Agent, or Firm*—Haynes and Boone, LLP

(57) ABSTRACT

In a method and system for controlling a device coupled to an information handling system, an object is defined to include a hardware and software component having a corresponding hardware operating state and a software operating state. The hardware component is operable to receive at least one hardware input, which is indicative of a target hardware operating state. The software component is operable to receive at least one software input, which is indicative of a target software operating state. A coordination component is included in the software component to receive the hardware and software inputs, and control the operating state of the device in response to the target hardware operating state and the target software operating state.

21 Claims, 7 Drawing Sheets

METHOD FOR CONSISTENT ON/OFF OBJECT TO CONTROL RADIOS AND OTHER INTERFACES

BACKGROUND

The present disclosure relates generally to information handling systems, and more particularly to techniques for improving the control of various devices included in an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, due to advances in the ease-of-use of information handling systems such as personal computers, coupled with technological advances such as incorporating 'intelligence' in many devices of the IHS such as digital cameras, printers and communication cards, users are able to enjoy the benefits of a truly plug-and-play type integration environment on their information handling systems. The hardware and software to operate many of these devices is typically factory installed. In some cases, a user may install new devices as add-ons. In these cases, the plug-and-play functionality automatically detects the new hardware and assists the user in loading the appropriate device driver software.

Presently, the IHS system and/or the user typically control the operation of the devices. Various well-known hardware and/or software methods are typically used for controlling the device. The control mechanism also includes a feedback mechanism from the device to the IHS system and/or the user. For example, the hardware method may simply include operating an on/off switch that may be present on each of the devices. In some cases, hardware devices having modular form-factors such as wireless network cards used in a portable IHS may be physically removed to control the operation of the device. In some IHS components such as cellular phones and pagers, a master hardware switch may be operated to power down or power up the device. Many computers may be completely shut off using a software mechanism. In some cases, the user may control the device by controlling the operation of the software driver or user interface for the device.

However, the operation of the devices, which are being controlled by the various well-known hardware and/or software methods, has generally been inconsistent and unsynchronized. This limitation has generally resulted in a lack of co-ordination of all inputs and outputs of the device being controlled, and a lack of adequate feedback to the user regarding the present operating state of the device. For example, a user may click on a wireless radio icon located in a system tray ('systray') portion of a display window and marked with a red 'X' to turn the device on. The hardware for the wireless radio device may be turned on, however the software may still be disabled thereby preventing the operation of the radio device. The present hardware and/or software methods used to control the radio device do not provide sufficient feedback to the user. As a result, the user is often not fully aware of why the radio device is not operational as instructed.

Therefore, a need exists to improve the control of various devices included in an IHS. More specifically, a need exist to develop tools and techniques for controlling these devices with improved consistency, synchronization and adequate feedback. Accordingly, it would be desirable to provide tools and techniques for improving the controls of devices included in an IHS absent the disadvantages found in the prior methods discussed above.

SUMMARY

The foregoing need is addressed by the teachings of the present disclosure, which relates to a system and method for controlling a device. According to one embodiment, in a method and system for controlling a device, an object is defined to include a hardware and software component having a corresponding hardware operating state and a software operating state. The hardware component is operable to receive at least one hardware input, which is indicative of a target hardware operating state. The software component is operable to receive at least one software input, which is indicative of a target software operating state. A coordination component is included in the software component to receive the at least one hardware and software inputs, and control the operating state of the device in response to the target hardware operating state and the target software operating state.

In one embodiment, a method for controlling a device includes coordination of all device inputs and outputs, maintaining consistency and synchronization between the operating states of the hardware and software components of the device, and providing feedback.

Several advantages are achieved by the method and system according to the illustrative embodiments presented herein. The embodiments advantageously provide for a system and method for controlling a device such as a wireless radio, which is independent of the radio technology, independent of the operating system, independent of the radio form factor, and independent of the IHS in which the radio is integrated.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

Many devices are controllable through hardware control means such as controlling an on/off switch present on the device hardware, and/or by software control means such as by enabling or disabling the driver software program. However, the operation of the devices, including it's UI, has generally been inconsistent and unsynchronized, possibly due to a lack of co-ordination of all inputs and outputs of the device being controlled, and a lack of adequate feedback to the user regarding the actual operating state of the device. It would be desirable to improve the interface to control the device by indicating the actual operating state of the device in comparison to a target or desired operating state of the device, and if the present operating state is not the same as the target operating state then indicating a possible reason for the discrepancy. According to one embodiment, in a method and system for controlling the device coupled to an information handling system, an object is defined to include a hardware and software component respectively having a hardware operating state and a software operating state. The hardware component is operable to receive at least one hardware input, which is indicative of a target hardware operating state. The software component is operable to receive at least one software input, which is indicative of a target software operating state. A coordination component is included in the software component to receive the at least one hardware and software inputs, and control the operating state of the device in response to the target hardware operating state and the target software operating state. A feedback is provided to the information handling system and/or the user to indicate the operating state of the device. Advantageously, the object coordinates and synchronizes all device inputs and outputs to provide consistency of operation. User interaction is coordinated and synchronized with the hardware and software control means.

Figure 1:
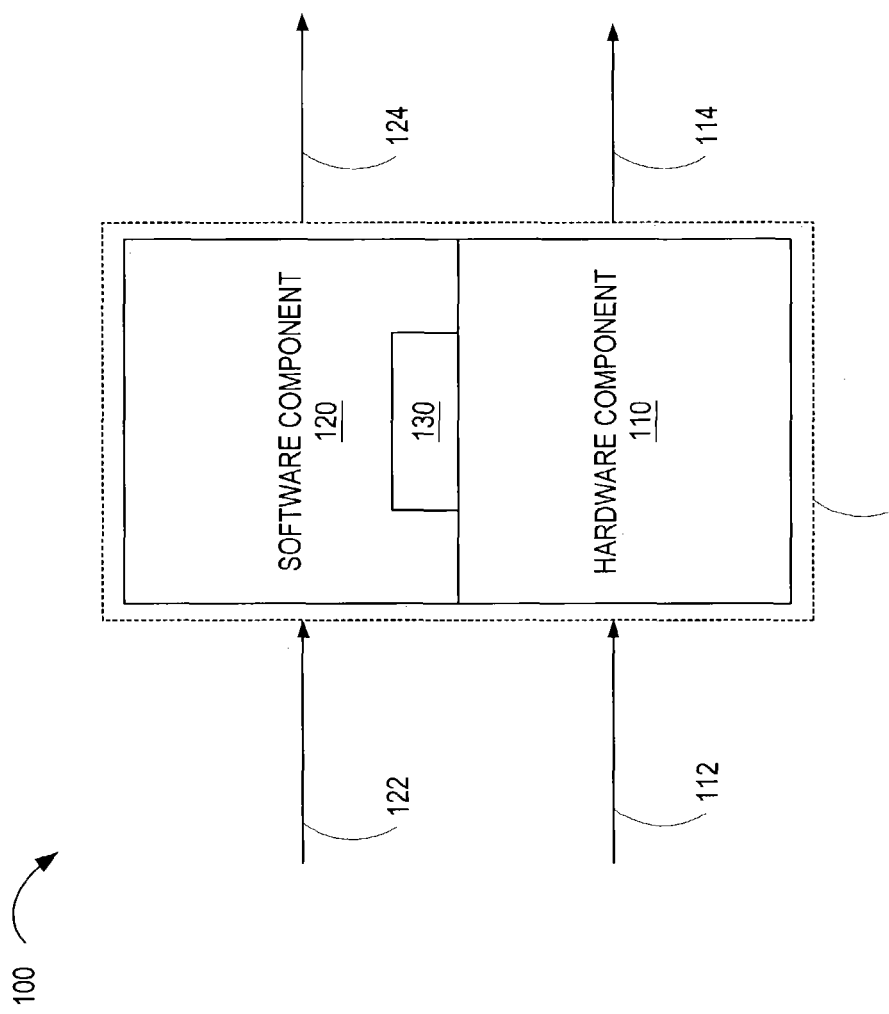
FIG. 1 illustrates a diagrammatic representation of an object for controlling an operating state of a device, according to an embodiment.

FIG. 1 illustrates a diagrammatic representation of an object 100 for controlling an operating state of a device, according to an embodiment. In one embodiment, the device, which is included in an IHS (not shown), is a communications device such as a wireless radio 105. The form factor of the wireless radio 105 may vary depending on the form factor of IHS. For example, in a portable IHS, the wireless radio 105 may be designed to be compatible with standards such as the Mini PCI (MPCI) or other. In some cases, the wireless radio 105 may be implemented on a proprietary form factor, or integrated in the IHS via silicon integration, or other modular or non-modular embodiments.

The wireless radio 105, operating under the control of the object 100, is operable in a plurality of operating states. For example, in an enabled operating state the wireless radio 105 is made capable of receiving and/or transmitting. In a disabled operating state the wireless radio 105 is made incapable of receiving and/or transmitting. Other operating states of the wireless radio 105 may include an unavailable operating state when the device is functioning improperly, such as when the communication errors exceed a predefined amount. In one embodiment, the object 100 separately controls a transmitter and receiver included in the wireless radio 105. In one embodiment, the object 100 separately controls multiple wireless radios included in the IHS. Further details describing various operating states of the wireless radio 105 are described in FIG. 4A.

In one embodiment, the wireless radio 105 is based on well-known communications protocol standards such as IEEE 802.11 (various flavors) and the Bluetooth™ (released by the Bluetooth Special Interest Group (SIG), Inc.) In one embodiment, the wireless radio 105 is based on a proprietary protocol. In one embodiment, the wireless radio 105 is based on wired or wireless networks, including local area network (LAN), metropolitan area network (MAN) and wide area network (WAN).

In the depicted embodiment, the object 100 includes a hardware component 110, a software component 120 and a coordination component 130. In one embodiment, the hardware component 110 is the same as the hardware portion of the device, e.g., the wireless radio 105. That is, the object 100 is implemented in the wireless radio 105. In one embodiment, the hardware component 110 includes an input/output controller component (not shown) of the IHS in addition to the wireless radio 105. In one embodiment, the software component 120 includes the device driver software program (not shown) for the wireless radio 105. The device driver software program may be included in the operating system of the IHS. In one embodiment, a portion of the software component 120 may be included in the wireless radio 105 as firmware. In one embodiment, the object 100 is implemented within the IHS rather than within the wireless radio 105.

The hardware component 110 has a hardware operating state such as (enabled or disabled), or (on or off). A user and/or the IHS is able to control the hardware operating state by instructing the hardware component 110 to change the hardware operating state to a desired or target operating state. The hardware component 110 is operable to receive at least one hardware input 112. The hardware input 112 is changed to change the target hardware operating state for the hardware component 110. For example, if the present hardware operating state for the hardware component is disabled or off, and the user and/or the IHS would like to change the hardware operating state to enabled or on then the user and/or the IHS generates an instruction or command to change the hardware input 112. The instruction or command may be in the form of turning on a binary switch associated with the hardware component 110. This information, which is indicative of the target hardware operating state, is received by the hardware input 112. The hardware component 110 is operable to generate at least one hardware output 114 in response to receiving the hardware input 112. The hardware output 114 provides feedback to the user and/or the IHS indicative of the operating state of the wireless radio 105. In one embodiment, the hardware output 114 includes a light emitting diode (LED) output, a sound output or a sensory feedback generating device.

Similarly, the software component 120 has a software operating state such as (enabled or disabled), or (executing or not executing). A user and/or the IHS is able to control the software operating state by instructing the software component 120 to change the software operating state to a desired or target operating state. The software component 120 is operable to receive at least one software input 122. By changing the state of the software input 122 the target software operating state for the software component 110 is changed. For example, if the present software operating state for the software component is disabled or not executing, and the user and/or the IHS would like to change the software operating state to enabled or executing then the user and/or the IHS generates an instruction or command to indicate the target software operating state. The instruction or command may be in the form of a user clicking on a button of a GUI associated with the software component 110. This information, which is indicative of the target software operating state, changes the software input 122. The software component 120 is operable to generate at least one software output 124 in response to receiving the software input 122. The software output 124 provides feedback to the user and/or the IHS indicative of the operating state of the device. In one embodiment, the software output 124 includes a graphical user interface (GUI) element, an icon, a simulated light emitting diode (LED) output, a returned parameter or a handle to a calling software program. In one embodiment, the software output 124 may also trigger the hardware output 114. Additional detail of the software component 120 is described in FIG. 3.

In one embodiment, the coordination component 130 is included in the software component 120. The coordination component 130 coordinates all inputs and outputs of the object 100, and hence of the wireless radio 105. The hardware and software components 110 and 120 are operable to exchange information via interrupts or poll events. The coordination component 130 is operable to receive the hardware input 112 coupled to the hardware component 110 and the software input 122 coupled to the software component 120. The coordination component 130 controls the operating state of the wireless radio 105 by receiving the hardware input 112 indicative of the target hardware operating state and the software input 122 indicative of the target software operating state and selecting the operating state of the wireless radio 105 consistent with the inputs 112 and 122. The selection of the actual operating state of the wireless radio 105 responsive to the inputs 112 and 122 is described in FIG. 2.

The object 100 may be implemented in a variety of ways: as a combination of hardware and software components 110 and 120, as hardware, as firmware and as software. In one embodiment, the software component 120 may be implemented partially or fully as firmware.

Figure 2:
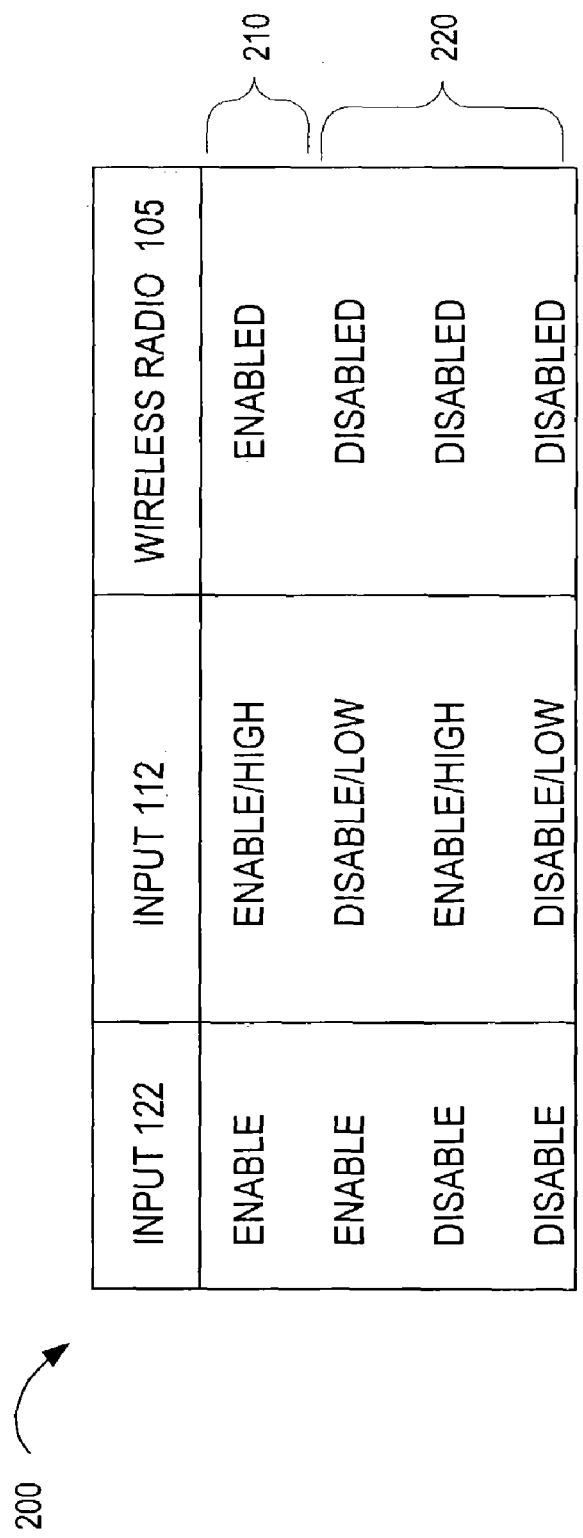
FIG. 2 illustrates a truth table for selecting an operating state of a device, according to an embodiment.

FIG. 2 illustrates a truth table 200 for selecting an actual operating state of the wireless radio 105, according to an embodiment. The object 100 is operable to control the operating state of the wireless radio 105 by selecting the wireless radio 105 to operate in an enabled operating state 210 in response to the inputs 112 and 122 indicating that the target hardware and software operating states are enabled. The object 100 is operable to select the wireless radio 105 to operate in a disabled operating state 220 in response to the inputs 112 and 122 indicating that the target hardware or software operating states are disabled.

Figure 3:
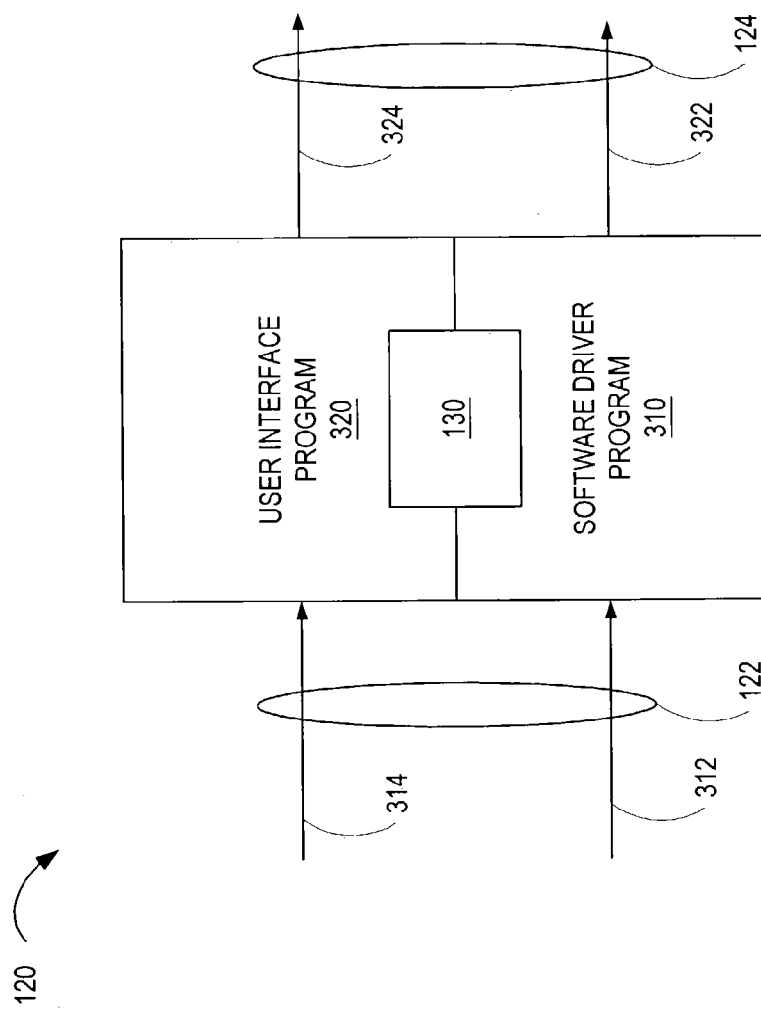
FIG. 3 illustrates further detail of a software component of the object shown in FIG. 1, according to an embodiment.

FIG. 3 illustrates a diagrammatic representation of the software component 120 of FIG. 1 to show further detail, according to one embodiment. In the depicted embodiment, the software component 120, in addition to the coordination component 130, also includes:

1) a software driver program 310 to provide an interface between the wireless radio 105 and the IHS (not shown). The IHS includes the wireless radio 105. The software driver program 310 receives a first software control input 312 included in the software input 122 and generates a first software output 322 included in the software output 124. For example, the first software control input 312 indicating a target software driver operating state is changed by a call made to an operating system of the IHS. As described earlier, the first software output 124 is indicative of the operating state of the wireless radio 105.

2) a user interface (UI) program 320 to provide feedback information to the user and/or the IHS. In some cases, the UI program 320 may generate the at least one software input 122. The UI program receives a second software control input 314 included in the software input 122 and generates a second software output 324 included in the software output 124. As described earlier, the second software output 324 is indicative of the operating state of the wireless radio 105. In one embodiment, the second software output 324 includes a graphical user interface (GUI) element, an icon, or a simulated light emitting diode (LED). In response to receiving the feedback via the first and second software outputs 322 and 324, the user and/or the IHS may change the inputs 112, 312 and 314 to change the operating state of the wireless radio 105.

Figure 4A:
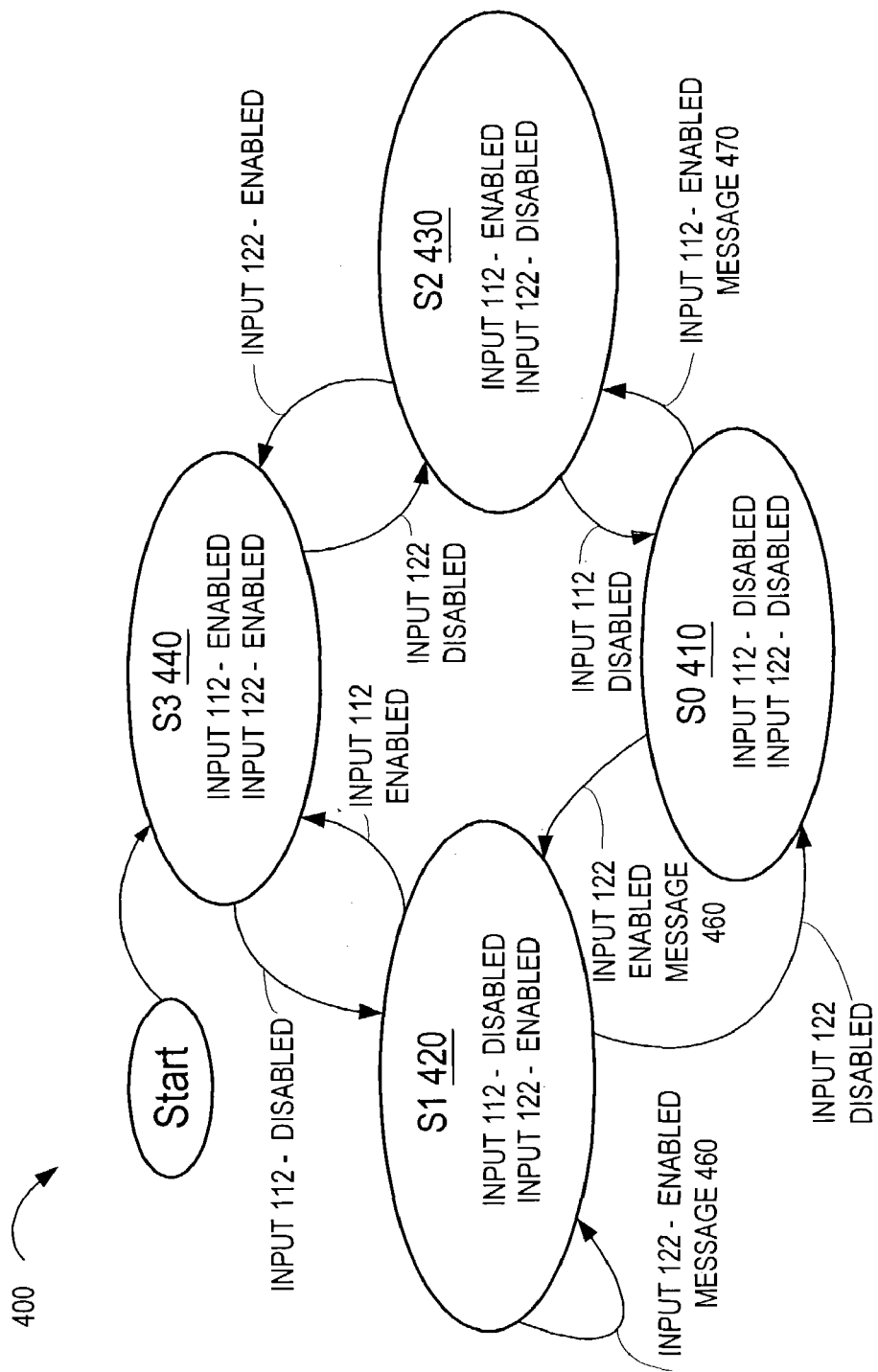
FIG. 4A shows detail of a state machine, according to an embodiment.

FIG. 4A shows detail of a state machine 400, according to an embodiment. In one embodiment, the object 100 performs control functions as shown by the state machine 400. In one embodiment, the state machine 400 is implemented in the wireless device 105 (not shown). In one embodiment, the logic associated with the state machine 400 is implemented in the coordination component 130 (not shown). In the depicted embodiment, the state machine 400 controls four operating states: an S0 410 state, an S1 420 state, an S2 430 state and an S3 440 state of the wireless device 105. The state machine 400 also defines a sequence of transitions among the various operating states, based on occurrence of certain events, conditions, inputs 112 and 122 and outputs 114 and 124 (not shown). In one embodiment, changing inputs 112 and/or 122 causes a change in the operating state of the wireless radio 105 or may result in a generation of a feedback message. The sequence of transitions among the various operating states is also described in FIG. 5.

On initialization or after startup of the wireless radio 105, the state machine 400 enters the S3 440 state. In one embodiment, on initialization the state machine 400 may be defined to enter another predefined or stored operating state, e.g., the S0 410 state, depending on application requirements.

In the S3 440 state the target hardware and software operating states indicated by the inputs 112 and 122 are enabled. In accordance with the truth table 200 described in FIG. 2, the wireless device 105 is selected to be in the enabled operation state, e.g., the S3 440 state. In the enabled operating state, the wireless radio 105 is made capable of receiving and/or transmitting. The hardware output 114 and the software output 124 provide feedback to the user and/or the IHS by indicating the present operating state of the wireless radio 105, e.g., the S3 440 state. In one embodiment, the hardware output 114, which is implemented as a LED, is turned on to indicate the wireless radio 105 is enabled. The second software output 324 provides feedback displaying a text message 'disable radio'.

Transition from the S3 440 state to the S1 state 420 occurs by disabling input 112. The reverse transition occurs by enabling input 112. In the S1 420 state, the target hardware operating state indicated by the input 112 is disabled and the target software operating state indicated by the input 122 is enabled. In accordance with the truth table 200 described in FIG. 2, the wireless device 105 is selected to be in the disabled operation state, e.g., the S1 420 state. In the disabled operating state, the wireless radio 105 is made incapable of receiving and/or transmitting. The hardware output 114 and the software output 124 provide feedback to the user and/or the IHS by indicating the present operating state of the wireless radio 105, e.g., the S1 420 state. In one embodiment, the hardware output 114, which is implemented as a LED, is turned off to indicate the wireless radio 105 is disabled. The second software output 324 provides feedback displaying a text message 'enable radio'. Transition from the S1 420 state to the S0 state 410 occurs by disabling input 122 and a reverse transition occurs by enabling input 122. In one embodiment, while attempting to transition from S0 410 state to the S1 420 state, the second software output 324 pops up a feedback message 460 indicating "Your wireless radio is still disabled. Use your hardware component input to enable it".

Transition from the S3 440 state to the S2 state 430 occurs by disabling input 114. The reverse transition occurs by enabling input 114. In the S2 430 state, the target hardware operating state indicated by the input 112 is enabled and the target software operating state indicated by the input 122 is disabled. In accordance with the truth table 200 described in FIG. 2, the wireless device 105 is selected to be in the disabled operation state, e.g., the S2 430 state. In the disabled operating state, the wireless radio 105 is made incapable of receiving and/or transmitting. The hardware output 114 and the at least one software output 124 provide feedback to the user and/or the IHS by indicating the present operating state of the wireless radio 105, e.g., the S2 430 state. In one embodiment, the hardware output 114, which is implemented as a LED, is turned off to indicate the wireless radio 105 is disabled. The second software output 324 provides feedback displaying a text message 'enable radio'. Transition from the S2 430 state to the S0 state 410 occurs by disabling input 112. The reverse transition occurs by enabling input 112. In one embodiment, while attempting to transition from S0 410 state to the S2 430 state, the second software output 324 pops up a feedback message 470 indicating "Your wireless radio is still disabled. Use your software component input to enable it".

In the S0 410 state, the target hardware and software operating states indicated by the inputs 112 and 122 are both disabled. In accordance with the truth table 200 described in FIG. 2, the wireless device 105 is selected to be in the disabled operation state, e.g., the S0 410 state. In the disabled operating state, the wireless radio 105 is made incapable of receiving and/or transmitting. The hardware output 114 and the software output 124 provide feedback to the user and/or the IHS by indicating the present operating state of the wireless radio 105, e.g., the S0 410 state. In one embodiment, the hardware output 114, which is implemented as a LED, is turned off to indicate the wireless radio 105 is disabled. The second software output 324 provides feedback displaying a text message 'enable radio'.

In one embodiment, the present operating state of the software component 120 and the present operating state of the hardware component 110 is "sticky" or is remembered (and hence is unchanged) during a change of an operating state of the IHS such as from a sleep state to a wake-up state. That is, as the IHS transitions through various states such as suspend, boot, or power save, the state machine 400 context is saved/restored through each transition. In one embodiment, upon start the first operating state entered may be defined by the save/restore function of the previous state machine context.

In one embodiment, the rules for transition between various operating states described above may be changed or are modifiable, as an option, based on the user requirements. For example, a rule for transitioning the S1 420 state to the S0 410 state when the input 122 is disabled may be disallowed to advantageously improve the consistency and efficiency of the user operation and/or UI.

Figure 4B:
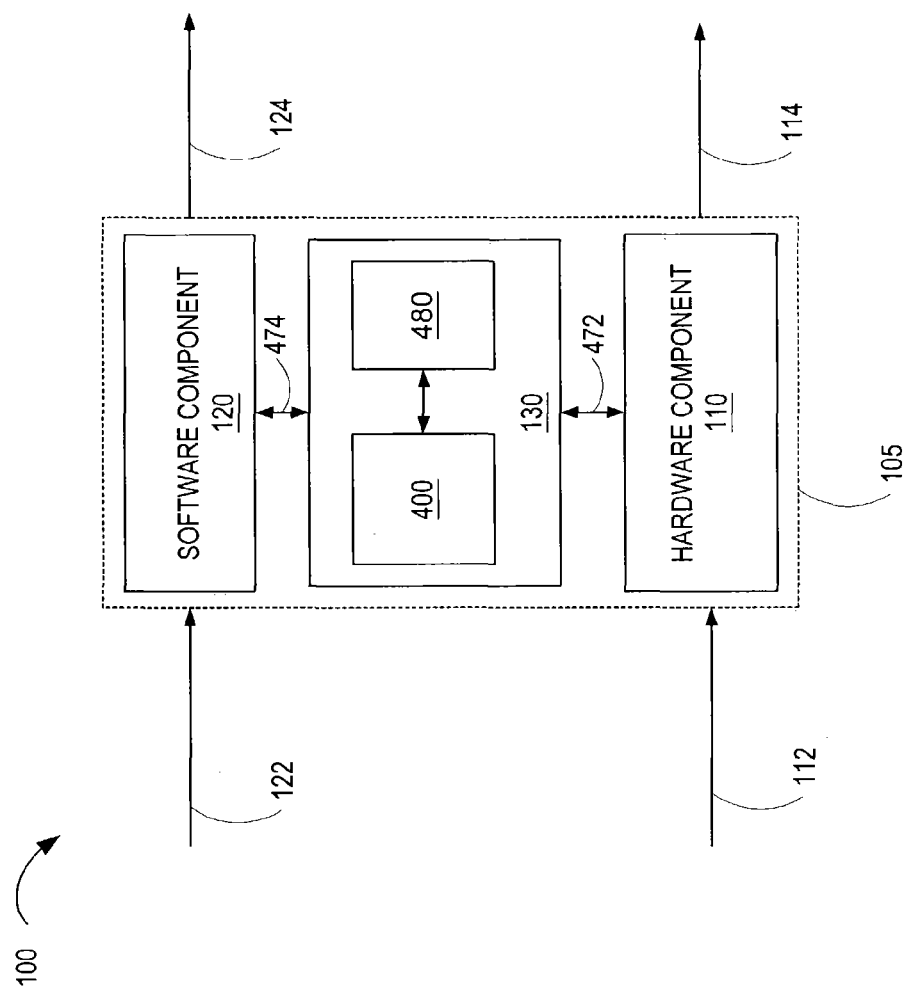
FIG. 4B illustrates further detail of the object of FIG. 1 controlling the state machine of FIG. 4A, according to an embodiment.

FIG. 4B illustrates further detail of the object 100 of FIG. 1 for controlling the state machine 400 of FIG. 4A, according to an embodiment. As described earlier, the hardware component 110 receives the at least one hardware input 112 and the software component 120 receives the at least one software input 122. In the depicted embodiment, the coordination component 130 is operable to receive an input via a link 472 from the hardware module 110 and a link 474 from the software module 120.

The coordination component 130 may be implemented in various ways such as the software component 120 (as shown in FIG. 1), the hardware component 110, a separate component such as firmware (not shown) or a combination thereof.

In one embodiment, the link 472 transfers values for the hardware input 112 received from the hardware component 110 to the coordination component 130, and the link 474 transfers values for the software input 122 from the software component 120 to the coordination component 130. In some cases the links 472 and 474 are used to transfer signals from the coordination component 130 to the hardware and software components 110 and 120 respectively. For example, feedback signal indicative of the actual operating state of the wireless radio 105 is transferred from the coordinator component 130 to the hardware and software components 110 to be output as the hardware and software outputs 114 and 124 respectively. In one embodiment, the hardware input 112 is provided to the software component 120 via the coordinator component 130. Similarly, the software input 122 is provided to the hardware component 110 via the coordinator component 130.

In one embodiment, the coordination component 130 may receive the hardware input 112 indirectly through the software component 120. That is, the hardware component 110 may send signals directly (not shown) to the software component 120 via interrupts or poll events. The software component 120 provides inputs to the coordination component 130 via the link 474.

In the depicted embodiment, the state machine 400 is included in the coordination component 130. In one embodiment, the state machine 400 is implemented in the hardware component 110, the software component 120, the firmware component (not shown), or a combination thereof. In accordance with the truth table 200 described in FIG. 2, the coordination component 130 receives the hardware and software inputs 112 and 122 and selects an enabled or disabled operating state of the wireless device 105 such as the S0–S3 410–430 states, responsive to the inputs 112 and 122. In addition, the coordination component 130 generates feedback signal indicative of the selected, i.e., the actual, operating state of the wireless radio 105, and transfers the feedback to be output as the hardware and/or software outputs 114 and 124 respectively. A state machine context store component 480 is operable to save/retrieve the operating state of the state machine 400 during transitions of the operating state of the IHS such as from power save mode to full performance, or from suspend to resume.

Figure 5:
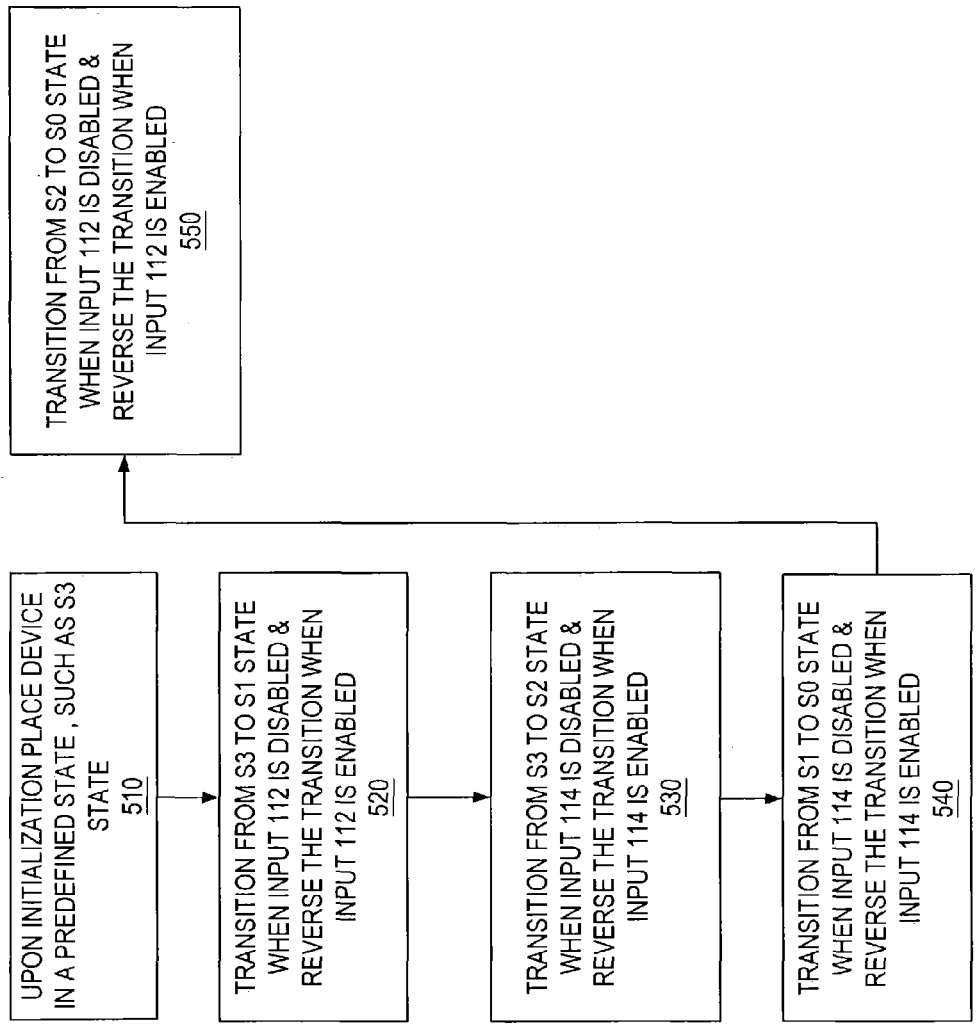
FIG. 5 is a flow chart illustrating a method for controlling a device, according to an embodiment.

FIG. 5 is a flow chart illustrating a method for controlling a device of an IHS, according to an embodiment. In step 510, the wireless radio 105 upon initialization is placed in the S3 440 operating state. In the S3 440 operating state, the hardware component 110 and the software component 120 of the wireless radio 105 are both enabled.

In step 520, the state machine 400 is transitioned from the S3 440 state to the S1 420 state in response to the hardware component 110 being disabled. The state machine 400 is returned from the S1 state 420 to the S3 440 state in response to the hardware component 110 being enabled.

In step 530, the state machine 400 is transitioned from the S3 state 440 to the S2 430 operating state in response to the software component 120 being disabled. The state machine 400 is returned from the S2 state 430 to the S3 440 state in response to the software component 120 being enabled.

In step 540, the state machine 400 is transitioned from the S1 420 operating state to the S0 410 operating state in response to the software component 120 being disabled. The state machine 400 is returned from the S0 410 state to the S1 420 state in response to the software component 120 being enabled.

In step 550, the state machine 400 is transitioned from the S2 430 operating state to the S0 410 operating state in response to the hardware component 110 being disabled. The state machine 400 is returned from the S0 410 state to the S2 430 state in response to the hardware component 110 being enabled.

Various steps described above may be added, omitted, combined, altered, or performed in different orders. For example, the step 510 may be altered so that upon initialization the state machine 400 is placed in another predefined or saved operating state such as the S0 410 operating state to disable the wireless radio 105. In one embodiment, the predefined or the saved operating state is stored in the state machine context store component 480.

Figure 6:
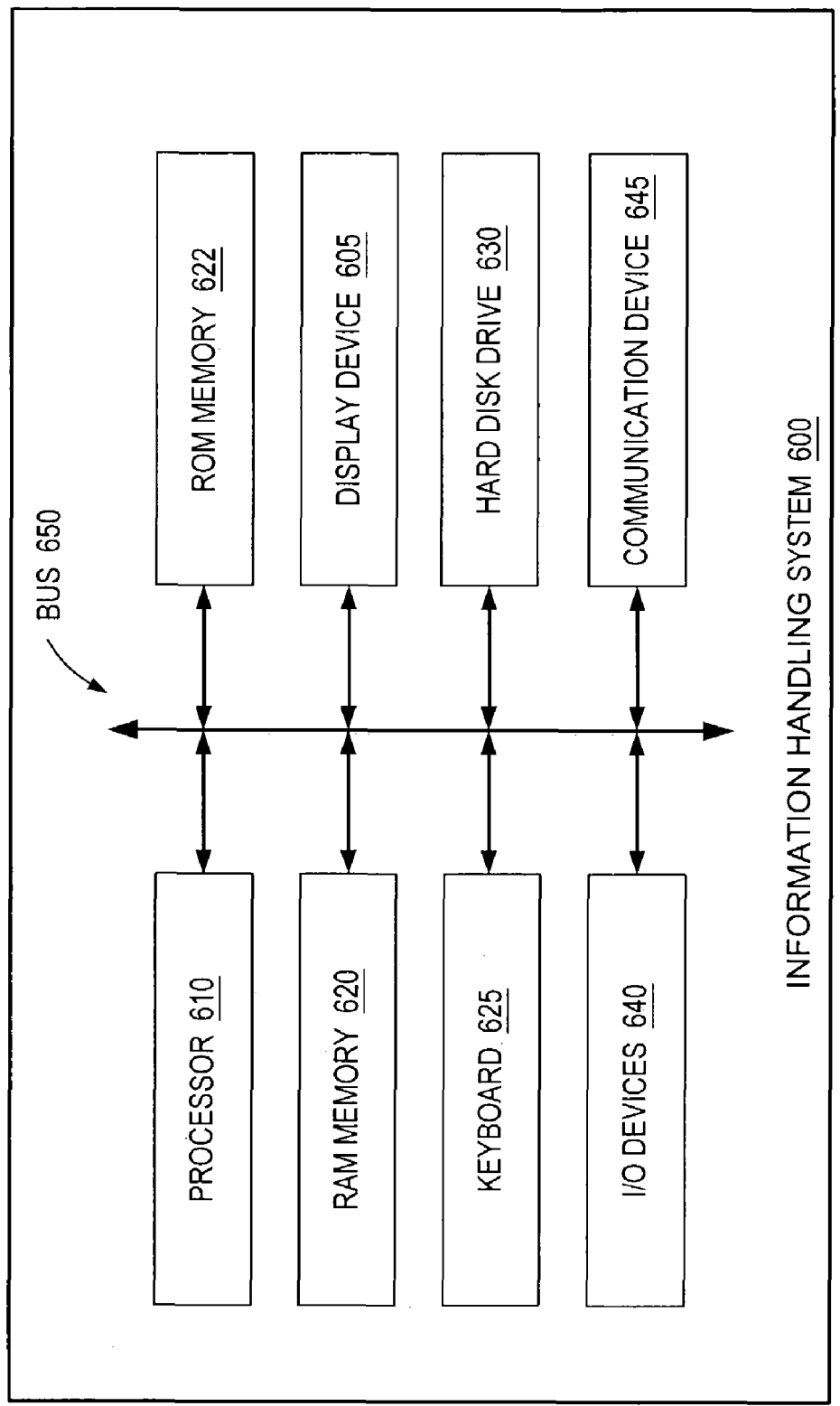
FIG. 6 illustrates a block diagram of an information handling system to implement method or apparatus aspects of the present disclosure, according to an embodiment.

FIG. 6 illustrates a block diagram of an information handling system to implement method or apparatus aspects of the present disclosure, according to an embodiment. For purposes of this disclosure, an information handling system 600 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 600 may be a personal computer, including notebook computers, personal digital assistants, cellular phones and gaming consoles, a network storage device, or any other suitable device and may vary in size, shape, performance, functionality, and price.

The information handling system 600 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 6, the information handling system 600 includes a processor 610, a system random access memory (RAM) 620, a system ROM 622, a display device 605, a keyboard 625 and various other input/output devices 640. It should be understood that the term "information handling system" is intended to encompass any device having a processor that executes instructions from a memory medium. The information handling system 600 is shown to include a hard disk drive 630 connected to the processor 610 although some embodiments may not include the hard disk drive 630. The processor 610 communicates with the system components via a bus 650, which includes data, address and control lines. A communications device 645, such as the wireless radio 105, may be connected to the bus 650 to enable information exchange between the system 600 and other devices. In one embodiment, multiple communication devices (not shown) may be included in one IHS, with each communication device being based on different or same technology. These one or more devices may be controlled by the object 400 or a plurality of objects through a combination of the same inputs 112 and 122 or independent inputs, and the IHS may include one or more implementations of this disclosure.

In one embodiment, the information handling system 600 may be used to implement the IHS described in FIG. 1. The processor 610 is operable to execute the computing instructions and/or operations of the information handling system 600. The memory medium, e.g., RAM 620, preferably stores instructions (also known as a "software program") for implementing various embodiments of a method in accordance with the present disclosure. In various embodiments the one or more software programs, such as the software driver program 310, are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
   a hardware component operable to receive at least one hardware input, the hardware input indicative of a target hardware operating state for the hardware component;
   a software component operable to receive at least one software input, the software input indicative of a target software operating state for the software component; and
   a coordination component included in the software component, the coordination component operable to receive the hardware and software inputs, the coordination component operable to control the operating state of the device in response to the target hardware operating state and the target software operating state, the coordination component including a state machine and a state machine context store component, whereby links between the hardware component, the software component and the coordination component transfer inputs, directly and indirectly, between the hardware component, software component and the coordination component.

2. The system of claim 1, wherein the coordination component is operable to control the operating state of the device by selecting one of four operating states, the four operating states comprising:
- an S0 state, wherein the target hardware and software operating states are disabled;
- an S1 state, wherein the target hardware operating state is disabled and the target software operating state is enabled;
- an S2 state, wherein the target hardware operating state is enabled and the target software operating state is disabled; and
- an S3 state, wherein the target hardware and software operating states are enabled.

3. The system of claim 2, wherein the device is electrically coupled to an information handling system, wherein the device is selected to operate in a predefined state after a startup of the information handling system.

4. The system of claim 2, wherein a change in the operating state of the device causes the hardware and software components to generate a feedback to an information handling system, the device being included in the information handling system.

5. The system of claim 4, wherein:
- the hardware component is operable to generate at least one hardware output in response to receiving the hardware input, the hardware output providing the feedback indicative of the operating state of the device;
- the software component is operable to generate at least one software output in response to receiving the software input, the software output providing the feedback indicative of the operating state of the device; and
- the coordination component operable to control the operating state of the device by selecting the device to operate in an enabled operating state in response to the target hardware and software operating states being enabled, and selecting the device to operate in a disabled operating state in response to the target hardware or software operating states being disabled.

6. The system of claim 5, wherein the enabled operating state is an S3 state, and the disabled operating state is an S0, S1 or S2 state.

7. The system of claim 5, wherein the hardware output includes a light emitting diode (LED) output, a sound output or a sensory feedback generating device.

8. The system of claim 5, wherein the software output includes a graphical user interface (GUI) element, an icon, a soft light emitting diode (LED) output, a returned parameter or a handle to a calling software program.

9. The system of claim 1, wherein causing a change in the target hardware or software operating state causes a change in the operating state of the device.

10. The system of claim 1, wherein the software component includes:
- a software driver program providing an interface between the device and an information handling system, the information handling system including the device, the software driver program being operable to receive a first software control input included in the software input and generate a first software output included in the software output, the first software output being indicative of the operating state of the device; and
- a user interface (UI) program providing feedback to the information handling system, the UI program being operable to receive a second software control input included in the software input and generate a second software output included in the software output, the second software output being indicative of the operating state of the device.

11. The system of claim 1, wherein the target software operating state is changed by changing the software input, wherein the software input is changed by a call made to a software program included in an information handling system, wherein the information handling system includes the device.

12. The system of claim 1, wherein the target hardware operating state is changed by changing the hardware input, wherein the hardware input is changed by an operation of a switch or signal.

13. The system of claim 1, wherein the device is a communications device.

14. The system of claim 13, wherein the communications device is a wireless radio.

15. The system of claim 14, wherein a transmitter and receiver included in the wireless radio is separately controlled.

16. The system of claim 1, wherein the operating state of the software component and the operating state of the hardware component is saved during a change of an operating state of an information handling system, wherein the information handling system includes the device.

17. An information handling system comprising:
- a processor;
- a system bus;
- a memory coupled to the processor through the system bus; and
- a device coupled to the processor and the memory through the system bus, wherein the device includes:
  - a hardware component operable to receive at least one hardware input, the hardware input indicative of a target hardware operating state for the hardware component;
  - a software component operable to receive at least one software input, the software input indicative of a target software operating state for the software component; and
  - a coordination component included in the software component, the coordination component operable to receive the hardware and software inputs, the coordination component operable to control the operating state of the device in response to the target hardware operating state and the target software operating state, the coordination component including a state machine and a state machine context store component, whereby links between the hardware component, the software component and the coordination component transfer inputs, directly and indirectly, between the hardware component, software component and the coordination component.

18. The system of claim 17, wherein the device is a communications device.

19. A method for controlling a device, the method comprising:
- initializing the device upon startup by placing the device in a predefined operating state, the predefined operating state being selected as an S3 operating state, wherein a hardware component and a software component of the device are enabled;
- transitioning the device from the S3 state to an S1 operating state in response to the hardware component being disabled and returning from the S1 state to the S3 state in response to the hardware component being enabled;

transitioning the device from the S3 state to an S2 operating state in response to the software component being disabled and returning from the S2 state to the S3 state in response to the software component being enabled;

transitioning the device from the S1 operating state to an S0 operating state in response to the software component being disabled and returning from the S0 state to the S1 state in response to the software component being enabled;

transitioning the device from the S2 operating state to an S0 operating state in response to the hardware component being disabled and returning from the S0 state to the S2 state in response to the hardware component being enabled; and providing a coordination component including a state machine and a state machine context store component, whereby links between the hardware component, the software component and the coordination component transfer inputs, directly and indirectly, between the hardware component, software component and the coordination component.

20. The method of claim 19, wherein the device is a communications device.

21. The method of claim 19, wherein rules defining the transitioning between any two operating states are modifiable in the communications device.

* * * * *